US011468667B2

United States Patent
Salemi et al.

(10) Patent No.: US 11,468,667 B2
(45) Date of Patent: Oct. 11, 2022

(54) DISTRIBUTED INTELLIGENT TRAFFIC INFORMATICS USING FIBER SENSING

(71) Applicant: NEC Laboratories America, Inc., Princeton, NJ (US)

(72) Inventors: Milad Salemi, Somerset, NJ (US); Ming-Fang Huang, Princeton, NJ (US)

(73) Assignee: NEC Corporation, Princeton (JP)

( * ) Notice: Subject to any disclaimer, the term of this patent is extended or adjusted under 35 U.S.C. 154(b) by 0 days.

(21) Appl. No.: 16/902,210

(22) Filed: Jun. 15, 2020

(65) Prior Publication Data

US 2020/0401784 A1    Dec. 24, 2020

Related U.S. Application Data

(60) Provisional application No. 62/968,189, filed on Jan. 31, 2020, provisional application No. 62/947,064, filed on Dec. 12, 2019, provisional application No. 62/863,505, filed on Jun. 19, 2019.

(51) Int. Cl.
*G06V 20/13* (2022.01)
*G06N 3/08* (2006.01)
*G06K 9/62* (2022.01)

(52) U.S. Cl.
CPC ......... *G06V 20/13* (2022.01); *G06K 9/6279* (2013.01); *G06N 3/08* (2013.01)

(58) Field of Classification Search
CPC ...... G06K 9/0063; G06K 9/6279; G06N 3/08; G06N 20/00; G08G 1/04; G08G 1/01; G01H 9/00
See application file for complete search history.

(56) References Cited

U.S. PATENT DOCUMENTS

| 6,404,506 B1* | 6/2002 | Cheng | G01B 11/04 250/559.22 |
| 2004/0061628 A1* | 4/2004 | Hill | G08G 1/02 340/942 |
| 2008/0277568 A1* | 11/2008 | Crickmore | G08G 1/02 250/227.12 |
| 2020/0124735 A1* | 4/2020 | Huang | G01S 19/03 |
| 2020/0313763 A1* | 10/2020 | Wang | G01D 5/35361 |

FOREIGN PATENT DOCUMENTS

GB    2513399 A  * 10/2014  ........... G08G 1/0125

OTHER PUBLICATIONS

1. Zhao H, Wu D, Zeng M, Zhong S. A Vibration-Based Vehicle Classification System using Distributed Optical Sensing Technology. Transportation Research Record. 2018;2672(43):12-23. doi:10.1177/0361198118775840 (Year: 2018).*

* cited by examiner

*Primary Examiner* — Fayyaz Alam
(74) *Attorney, Agent, or Firm* — Joseph Kolodka

(57) ABSTRACT

Aspects of the present disclosure describe systems, methods and structures providing wide-area traffic monitoring based on distributed fiber-optic sensing (DFOS) that employs deep neural network(s) for denoising noisy waterfall traces measured by the DFOS. Such systems, methods, and structures according to aspects of the present disclosure may advantageously monitor multiple highways/roadways using a single interrogator and optical fiber switch(es) which provides traffic information along every sensing point of existing, deployed, in-service optical telecommunications facilities.

9 Claims, 8 Drawing Sheets

DISTRIBUTED INTELLIGENT TRAFFIC INFORMATICS USING FIBER SENSING

CROSS REFERENCE

This disclosure claims the benefit of U.S. Provisional Patent Application Ser. No. 62/863,505 filed Jun. 19, 2019, U.S. Provisional Patent Application Ser. No. 62/947,064 filed Dec. 12, 2019, and U.S. Provisional Patent Application Ser. No. 62/968,189 filed Jan. 31, 2020, the entire contents of each incorporated by reference as if set forth at length herein.

TECHNICAL FIELD

This disclosure relates generally to distributed optical fiber sensing systems, methods, and structures. More particularly, it describes distributed intelligent traffic informatics using fiber sensing.

BACKGROUND

Distributed sensing using coherent Rayleigh backscattering in an optical fiber has become a ubiquitous technique for monitoring multiple dynamic events in real time, thanks to its interesting applications in numerous safety, security, and integrity monitoring systems. One such application includes intelligent traffic monitoring and informatics.

SUMMARY

An advance in the art is made according to aspects of the present disclosure directed to distributed intelligent traffic informatics using optical fiber sensing.

Viewed from a particular aspect, systems, methods and structures according to the present disclosure provide wide-area traffic monitoring based on distributed fiber-optic sensing (DFOS) employing deep neural network(s) for denoising noisy waterfall traces measured by the DFOS. Such systems, methods, and structures according to aspects of the present disclosure may advantageously monitor multiple highways/roadways using a single interrogator and optical fiber switch(es) which provides traffic information along every sensing point of existing, deployed, in-service optical telecommunications facilities.

BRIEF DESCRIPTION OF THE DRAWING

A more complete understanding of the present disclosure may be realized by reference to the accompanying drawing in which:

FIG. 4(A), part of fiber routes used in a trial; FIG. 4(B) experimental setup; and FIG. 4(C) waterfall traces for different routes, according to aspects of the present disclosure;

FIG. 5(A), vehicle speed and flow for 2 section of a trial route; FIG. 5(B), the data (S2 on Route 5) fitted with proposed speed-flow formula and data (Route 2) fitted with Greenshields' model (i), according to aspects of the present disclosure The illustrative embodiments are described more fully by the Figures and detailed description. Embodiments according to this disclosure may, however, be embodied in various forms and are not limited to specific or illustrative embodiments described in the drawing and detailed description.

DESCRIPTION

Figure 1:
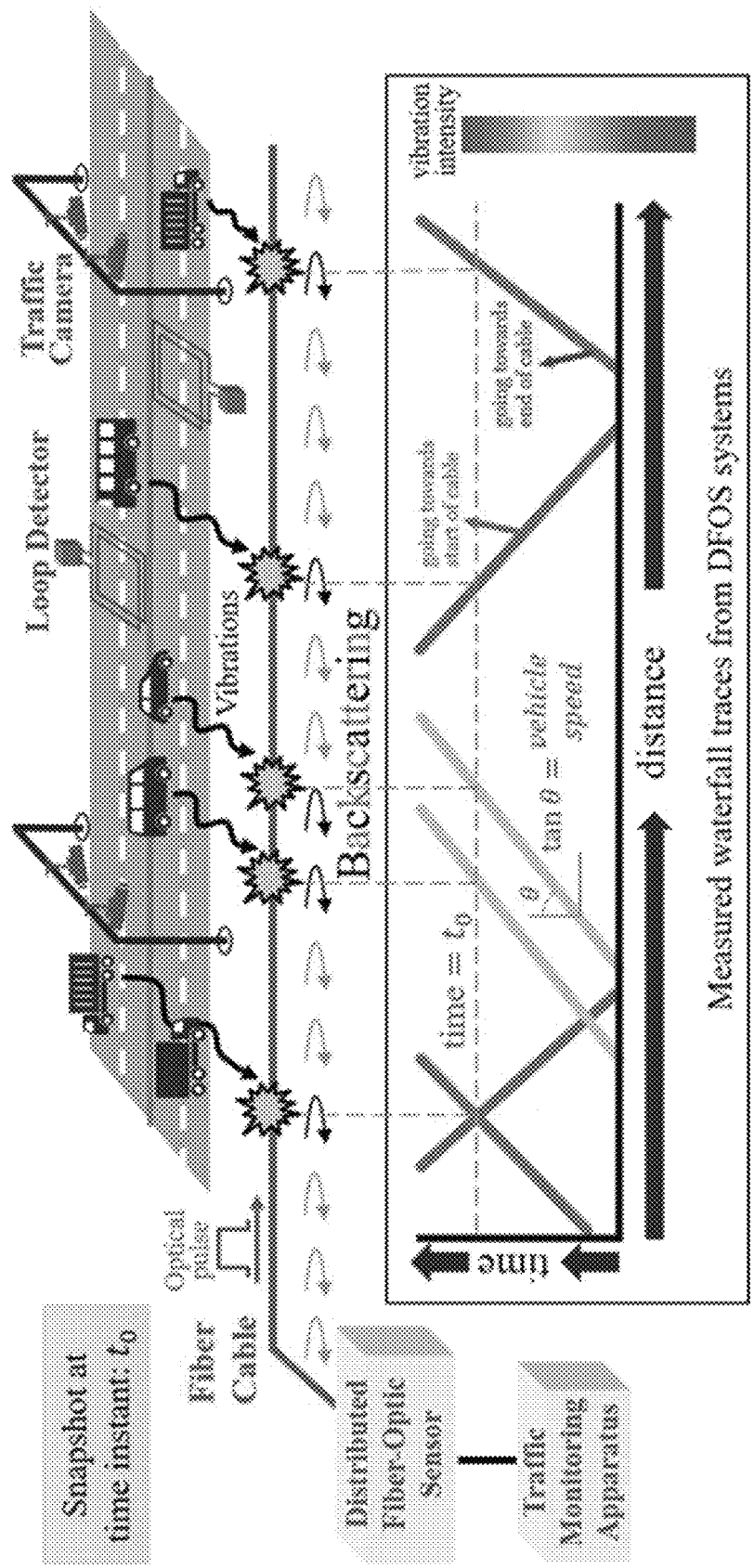
FIG. 1 is a schematic diagram illustrating a distributed fiber-optic sensing based traffic monitoring according to aspects of the present disclosure.

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGs comprising the drawing are not drawn to scale.

By way of some additional background, we note that the ability to collect accurate traffic volume and vehicle class data is a major contributor to the design and management of transportation infrastructure(s) such as those provided/managed/maintained by a Department of Transportation (DOT). This data—coupled with population projection growth data and vehicle needs by that population highlights the need to maintain updated traffic database for roadway arteries—which are important elements of an active and growing economy.

We note further and as will be readily understood and appreciated by those skilled in the art, optical fiber networks have found widespread use for the rapid transmission of large volumes of data. Leveraging the deployment of such networks, distributed optical fiber sensing (DOFS) systems have been applied to a wide range of applications such as infrastructure monitoring.

In distributed acoustic sensing (DAS) and distributed vibration sensing (DVS)—two illustrative examples of DOFS—backward Rayleigh scattering effects are used to detect changes in fiber strain, while the fiber itself acts as the transmission medium for conveying an optical sensing signal back to the interrogator. An obtained dynamic strain signal is used to detect vibration and acoustic signal along the fiber with location information about where the signal(s) originate along the fiber.

A DFOS system provides a cost effective solution to monitor traffic over extended geographic areas. A DFOS system utilizes the fiber infrastructure already installed underneath/alongside/proximal to highways to detect changes in its surrounding environments. The basic operational principle of DFOS used to monitor traffic is the detection/measurement of a change in vibration experienced by a point on an optical fiber due to the passing of a vehicle—or some other environmental event.

As noted further, reports of DFOS based traffic monitoring describe systems and methods that lack at least one of the following two aspects: they do not use an optical fiber already installed beneath a highway; or they only utilize a small section (or few points) of an optical fiber cable.

Advantageously, vehicle classification and counting based on DVS or DAS data—depending on available processing—can provide instant feedback about traffic pattern(s) along a roadway in real time. This feedback may include instantaneous traffic data on sections of roadway that experiences heavy vehicle traffic such as trucks and trailers. The ability to identify and categorize heavy vehicle highway usage is important to stakeholders and traffic engineers for design, maintenance, and development of highways and roadways.

As those skilled in the art will understand and appreciate, the raw data collected from DAS or DVS—although they carry useful traffic data—can be highly noisy and require significant processing for subsequent interpretation. Fortunately, Artificial Intelligence (AI) tools such as machine vison and machine learning (ML) may be used to analyze collected/stored and/or real time data. Consequently, information such as traffic flow, axle class and count, and speed for various classes of vehicles can be reported in real time.

One such measure, a weight-in-motion (WIM) measurement, is one of the most prevalent methods employed in allowable axle load enforcement which directly detects over-weight axles in motion by use of embedded sensors in a particular section of a roadway. In addition, stationary and drone based traffic cameras have been previously used for monitoring traffic and analyzing traffic flow using machine vision.

As will be readily appreciated, roadways as connecting elements of a transportation network usually lay out the corridors for implementation of distribution of other infrastructures, services, and amenities to communities. Services such as electricity transmission lines, pipelines, and data networks—including fiber optic networks—among others.

As we shall now show and describe, systems, methods, and structures according to aspects of the present disclosure advantageously employ in-place, embedded, deployed, optical infrastructure that are component parts of optical communication networks to harvest valuable transportation related data.

According to aspects of the present disclosure, such fiber optic network infrastructure—which usually passes proximal to existing roads and highways—advantageously acts as an ultra-sensitive contentious distributed vibration sensor. Using the DAS and DVS devices, structures, and methods, vibration data is collected and processed to establish our Distributed Intelligent Traffic Informatics (DITI) system.

As used herein, DITI is an AI-based traffic analysis and management unit that reports traffic flow elements such as volume, speed, vehicle class (cars, vans, buses, tracks), and axles (single, tandem, and tridem)—both in real time and/or offline as necessary and/or desired. Collected data and derived information may advantageously be incorporated into Geographic Information Systems (GIS) for infrastructure stake holders to provide transportation and traffic management, and other decision making purposes.

FIG. 1 is a schematic diagram illustrating a distributed fiber-optic sensing based traffic monitoring according to aspects of the present disclosure.

As shown in that figure, the DFOS system includes a distributed fiber-optic sensor and a traffic monitoring apparatus used to measure the effects of vehicles passing along a roadway and estimate traffic flow rates, average speeds, and travel times.

A schematic illustration of measured Time vs. Distance waterfall traces produced by the illustrative DFOS system is shown in the figure. In addition to a corresponding traffic snapshot at time instant $t_0$, an aggregate of all the vibrations along each section of the roadway at each time instant is represented as the time-distance graph, which is described in the art as a waterfall trace. During operation, as a vehicle traverses along the roadway, its corresponding vibration pattern can be observed from the waterfall trace. Vehicles passing closer to the optical fiber cable (travelling left to right in the figure) have stronger vibration patterns as compared to the vehicles travelling in the opposite direction. Also, vehicles travelling towards the start and end of the cable will generate trace(s) exhibiting opposite inclinations. The instantaneous speed of a vehicle can be estimated using slope of its vibration pattern at any instant of time or location. Advantageously, the total number of such patterns indicates the total number of vehicles travelling along a roadway.

Figure 2:
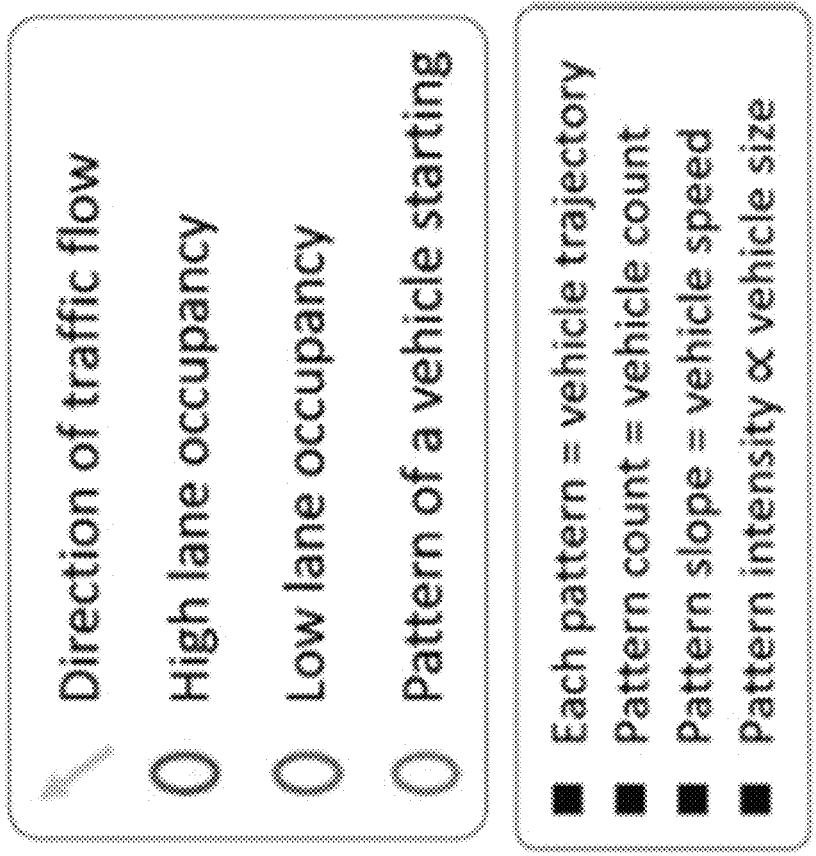
FIG. 2 illustrates a waterfall trace (time-distance graph) obtained using a DFOS system according to aspects of the present disclosure.
Figure 2:
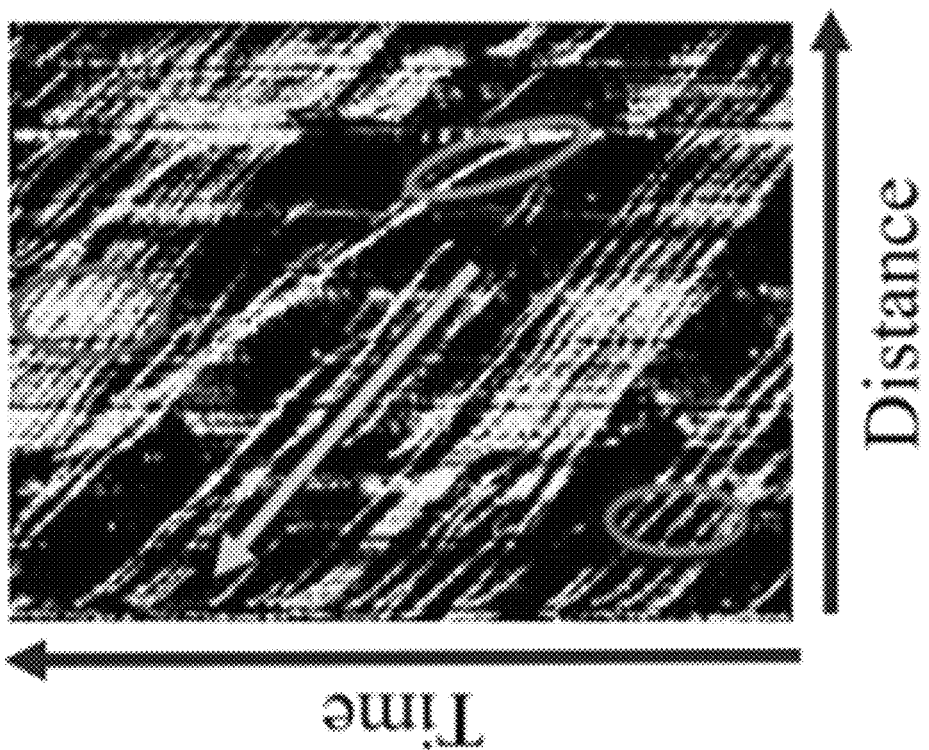

In contrast to the no-noise illustration in FIG. 1, real-world waterfall traces are corrupted by various types of noises. These noises can result from the presence of ambient ground vibrations, irregular fiber cable installation and structural variations. Such real-world illustration of a waterfall trace is shown in FIG. 2.

From that figure, it may be observed that there are several vehicles on the roadway, each having a unique vibration pattern depending on the vehicle movement, dimensions, and proximity to the cable.

At this point we note that several interesting characteristics can be observed from the above waterfall traces. The overall traffic flows from the right to the left (towards the start of cable) with time. In the area marked with red, there are more vehicles (high traffic density) as compared to the area marked with green. Such characteristics are an indication of the lane occupancy and therefore congestion. Vibration pattern of a vehicle increasing its speed steadily can be seen in the blue area. We can also see that some patterns are thicker as compared to the others, which can indicate the weight or dimensions of a vehicle. Using a DFOS system along a single fiber cable laid over a wide-area can help to decode and put together all the aforementioned traffic flow properties and be useful in creating an effective traffic monitoring solution.

As will be readily understood by those skilled in the art—and in sharp contrast to the prior art—systems, methods, and structures according to aspects of the present disclosure advantageously employ noisy waterfall traces (aggregated time-series data of all sensing points) along an existing, irregularly laid optical fiber cable to monitor traffic traversing a roadway proximal to that optical fiber. As we shall show and describe, our DITI advantageously efficiently extracts such vehicle patterns from these noisy waterfall traces.

Figure 3:
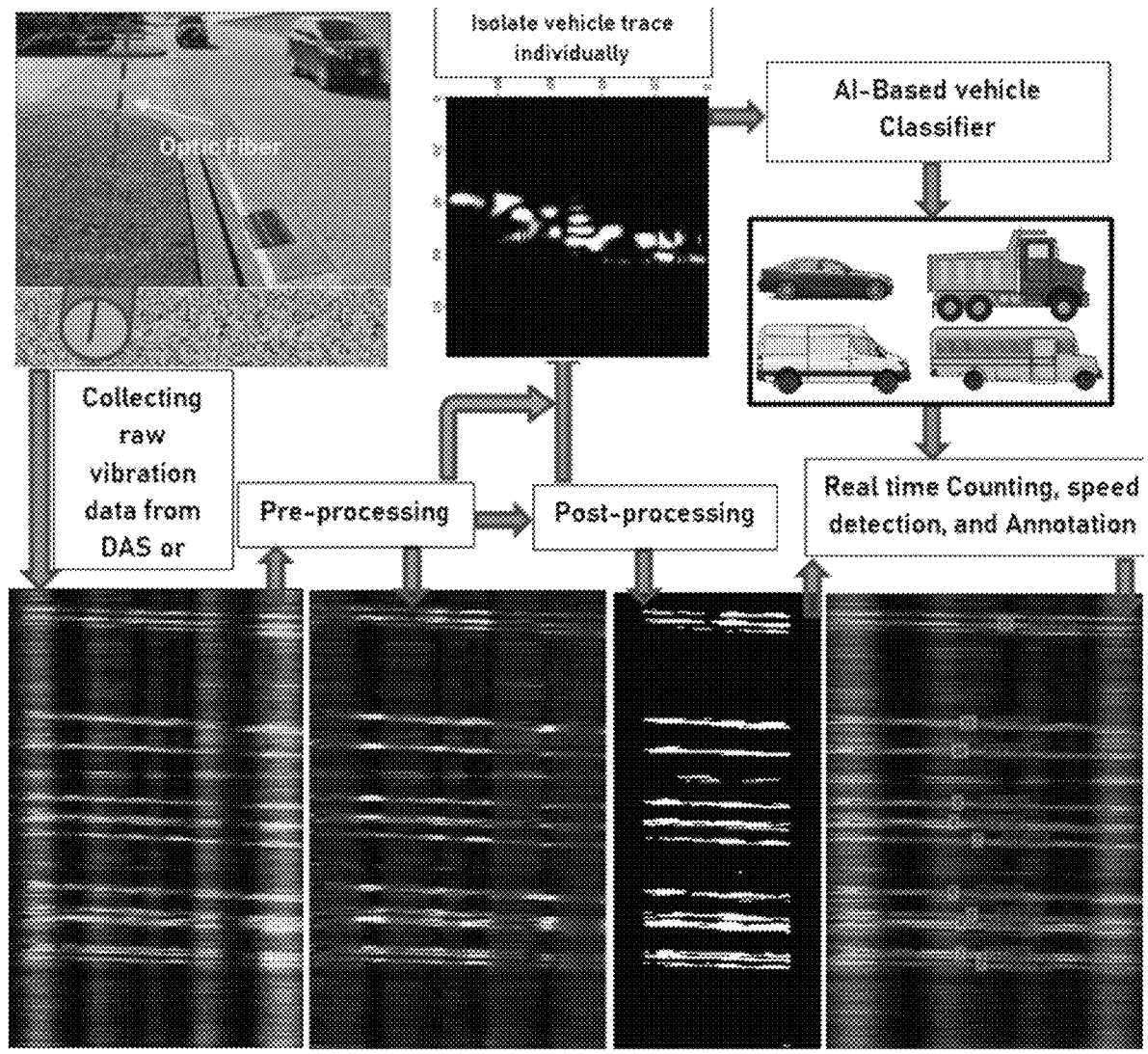
FIG. 3 is a schematic diagram illustrating distributed intelligent traffic informatics (DITI) real-time processing cycle(s) according to aspects of the present disclosure.

FIG. 3 is a schematic diagram illustrating distributed intelligent traffic informatics (DITI) real-time processing cycle(s) according to aspects of the present disclosure.

According to aspects of the present disclosure—with our vehicle trace detection scheme (DITI), the DFOS (DAS or DVS) is finely tuned to produce visually recognizable vehicle traces associated with existing fiber network locations and external environmental conditions occurring at those location(s).

As illustrated in the figure, raw vibration signals are collected in form of 2-Dimenssional (2D) images and provided to a pre-processing algorithm(s). During pre-processing in the pre-processing unit, an image undergoes normalization, contrast stretching and thresholding to magnify vehicle traces. The pre-processed image data is then applied to a post-processing—in a post-processing unit—that appropriately alters the image(s) using morphological manipulation and various filter kernels.

Detected vehicle traces are then isolated and masked out of a normalized image. Isolated vehicle traces are then standardized by conversion to square shape images for training of the machine learning (ML) classifier network.

Advantageously—and according to further aspects of the present disclosure—our ML classifier algorithm is capable of implementing various combinations of softmax regression, Neural Networks (NN), and Convolutional Neural Networks (CNN) to select a best classifier to employ for an individual site. Our developed classifier network is advantageously able to identify the class of vehicles with an accuracy of 90% or better. The tags of each detected vehicle and time series of traffic flow and speed of each vehicle class can be reported separately.

We then apply our counting and speed detection algorithm which is able to robustly achieve an accuracy of 95% or better with respect to detecting vehicles and evaluating their speed. Of further advantage, our algorithm may generate indications of traffic flow, and vehicle speed time series with the same high-level of accuracy.

Field Trial

While using optical fiber to detect motor traffic on public roadways has been known and studied by many groups—particularly where a fiber-optic interferometer and dedicated fiber proximal to a roadway were used, all such studies involve, however, sensing over purpose-built fiber cables.

Recently, the inventors of the instant disclosure reported for the first time that deployed telecommunications optical fiber cables—which were not built for sensing rather built for carrying high speed data—can advantageously be used to simultaneously detect roadway traffic and roadway conditions as well. Our work proved that a telecom service provider's existing/deployed optical fiber networks can be viewed/used as sensor networks as well—which increases the value of the service provider's optical infrastructure investment.

In our previous work, we showed the detection of motor traffic on one optical fiber telecommunications route. Herein we show and describe the detection of motor traffic and road capacity on multiple optical fiber routes by integrating a fiber sensing system with a photonic switch. Our results of our experiments show that monitoring motor traffic on different routes can be remotely controlled, automatically managed, and characteristics of traffic streams determined.

Figure 4A:
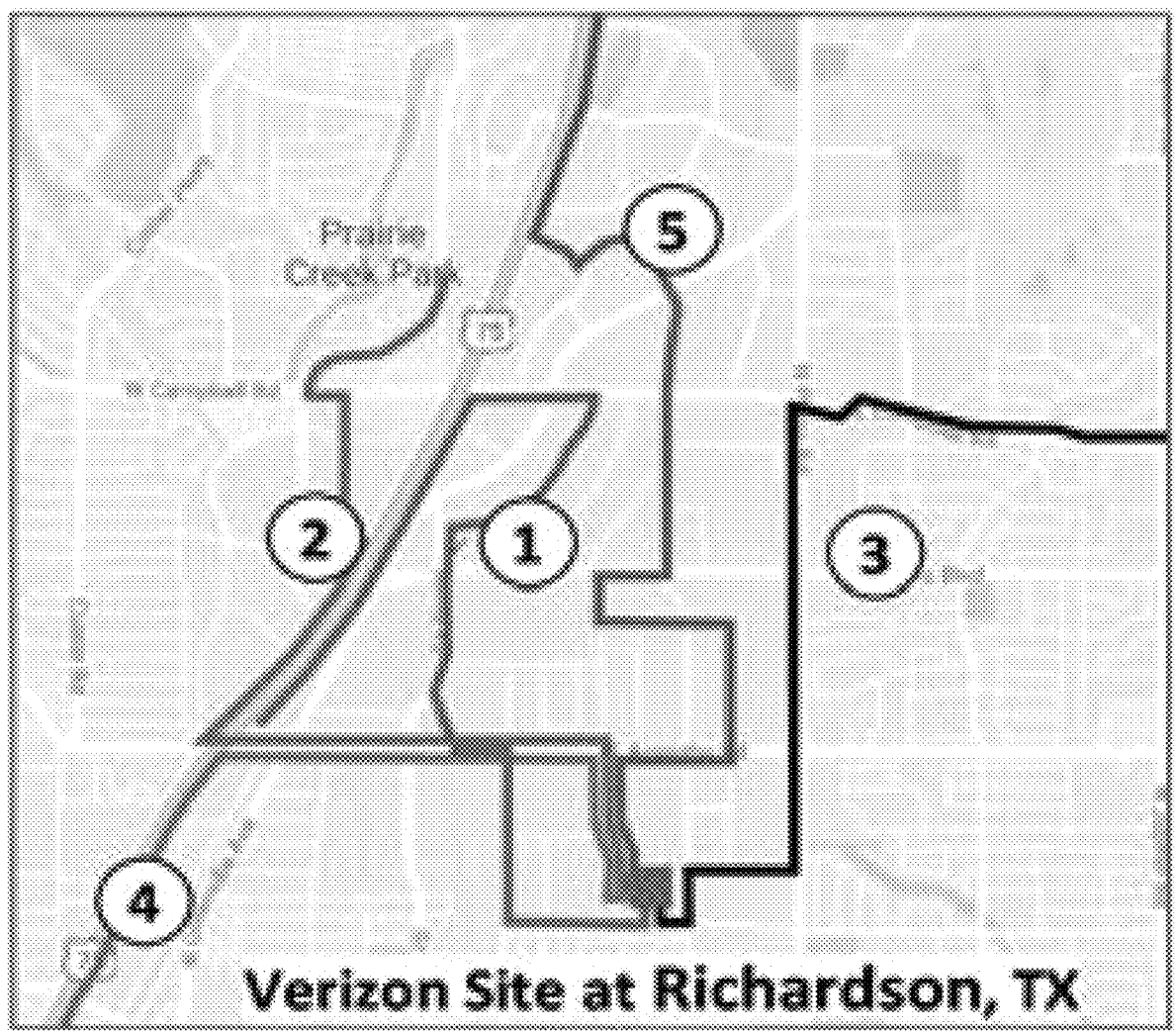
FIG. 4(A), FIG. 4(B) and FIG. 4(C) schematically illustrate.
Figure 4B:
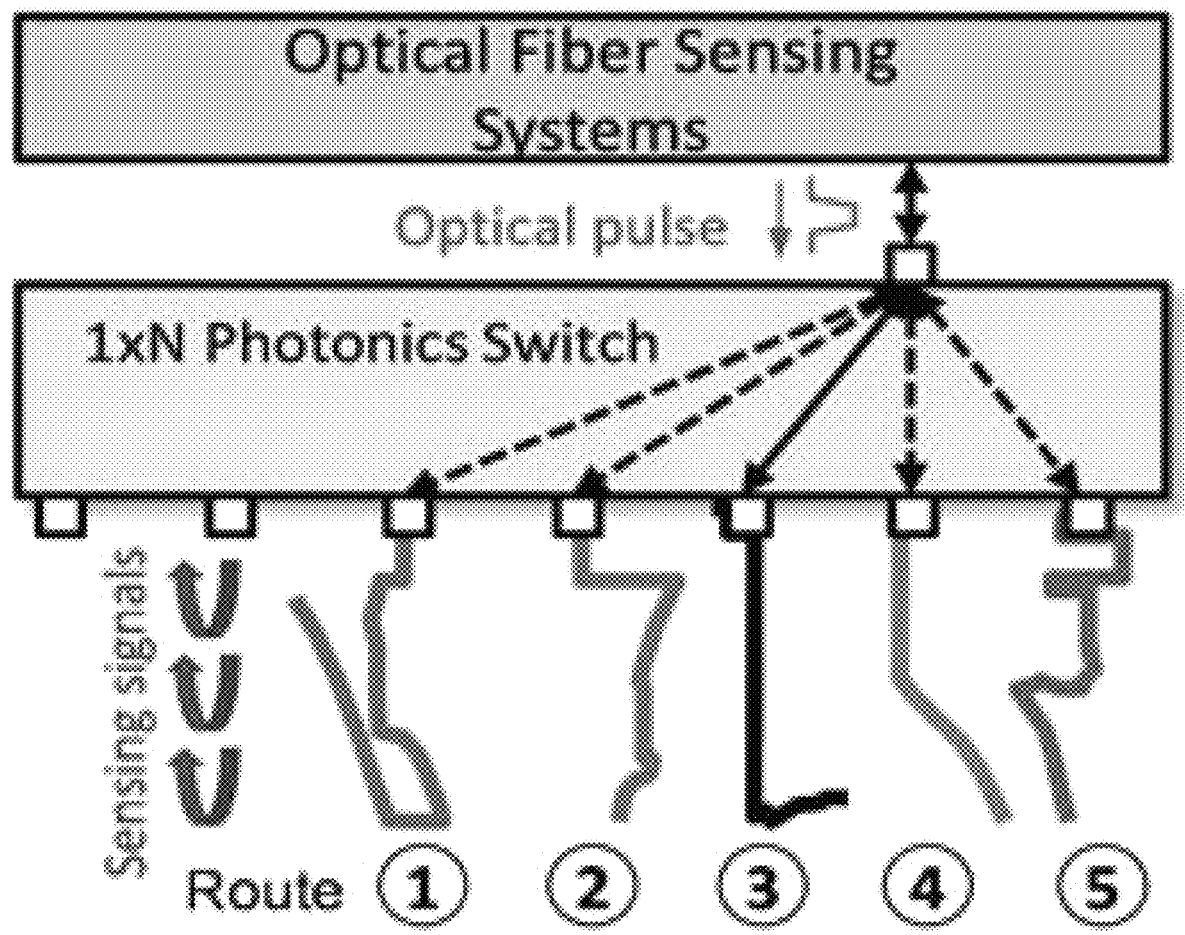
Figure 4C:
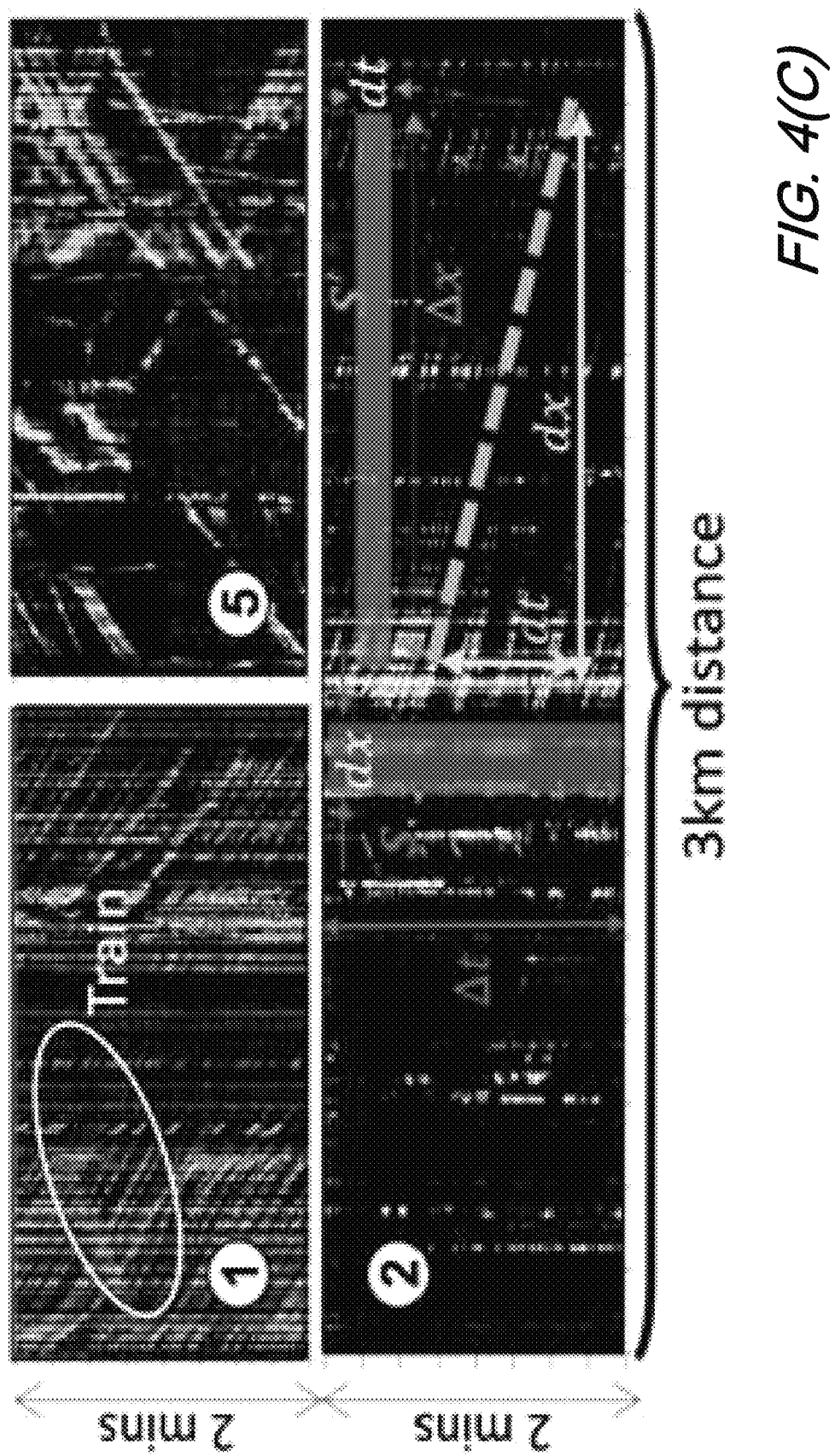

To conduct our experimental field trial, we selected five telecommunications optical fiber cable routes in Dallas, Tex. FIG. 4(A), FIG. 4(B) and FIG. 4(C) schematically illustrate: FIG. 4(A), part of fiber routes used in a trial; FIG. 4(B) experimental setup; and FIG. 4(C) waterfall traces for different routes, according to aspects of the present disclosure.

As may be observed from the figure(s), there are two routes from the metro core network in the area, and three routes from access networks. The metro core routes comprise of a 25-km span (Route 1) and a 55-km one (Route 5) while the access routes includes a 6.8-km (Route 2), a 7.5-km (Route 3) and a 10-km (Route 4) spans of SSMF running from a network node site. The optical fiber cables are buried at a depth of 36-48 inches and are carrying—or will carry—live data traffic.

An optical fiber sensing system integrated with a photonic switch was used in the trial. The optical fiber sensing system employed on-chip fast processing to enable an equivalent sensor resolution as fine as 1 meter. A photonics switch was used to switch sensing signals to different routes with routing time less than 500 ms. Accordingly, vehicle traffic on multiple fiber routes are monitored.

A waterfall trace is advantageously used to display the seismic energy detected by sensing system. It presents the environmental vibration intensity received by back scattering signals along different times (vertical axis) and locations (horizontal axis). FIG. 4(C) shows waterfall traces of selected sections of different routes in 2-minutes duration and 3-km distance for route 1, 2 and 5. It displays the traffic condition along the route. Driving directions, driving speed and vehicle weight can be ascertained. By employing digital signal processing systems and methods (DSP), information is extracted to show traffic patterns. In that FIG. 4(C)—frame 1, vehicle acceleration/deceleration and light rail trajectories are observed. Quiet areas appear in FIG. 4(C)—frame 2 for local roads inside residential areas while crossing patterns of intersections are shown in FIG. 4(C)—frame 5.

We note that image processing and machine learning methods/algorithms were employed for data processing and analysis such as studying space-time trajectories of vehicles.

Figure 5A:
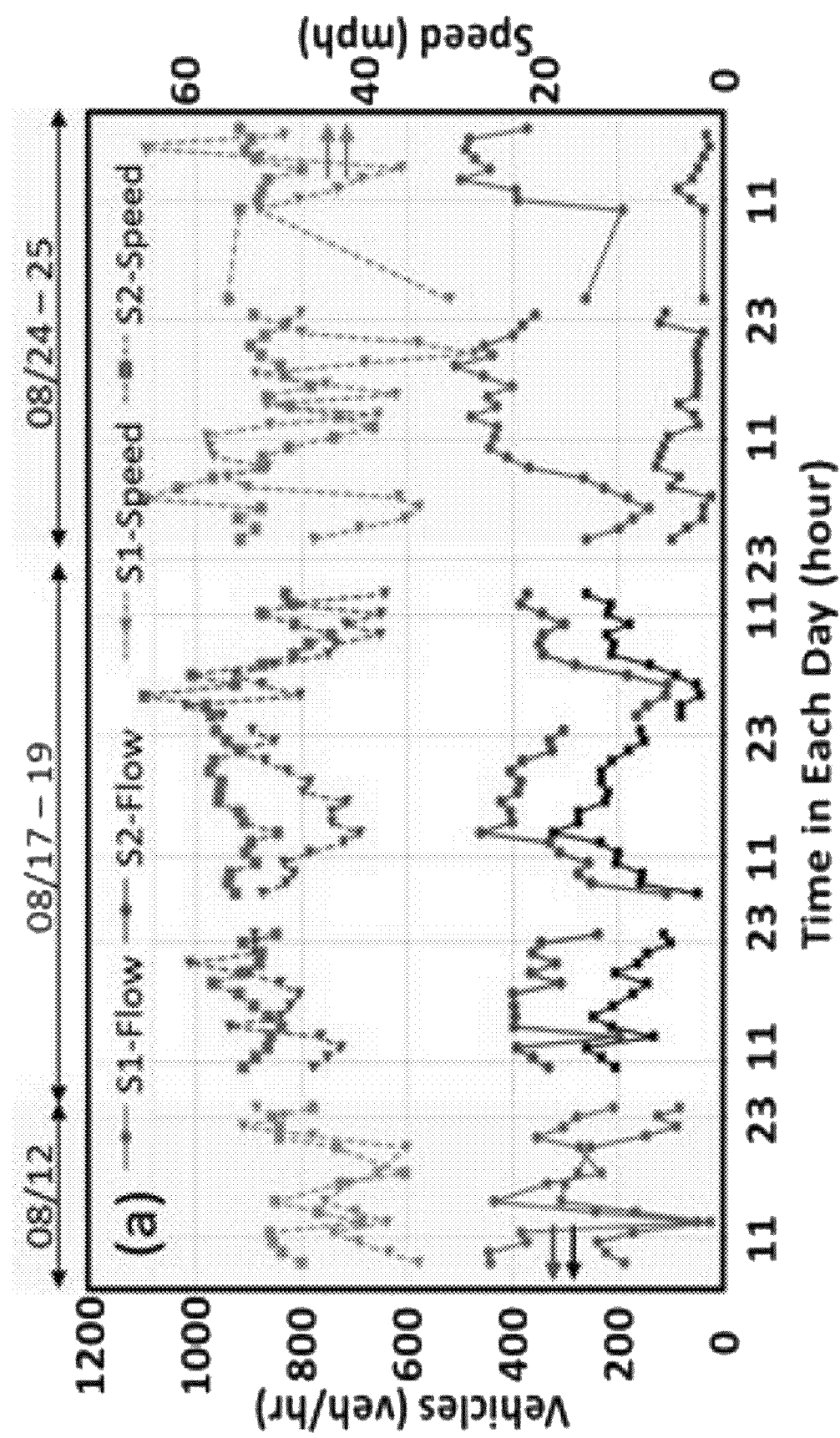
FIG. 5(A) and FIG. 5(B) are plots showing.
Figure 5B:
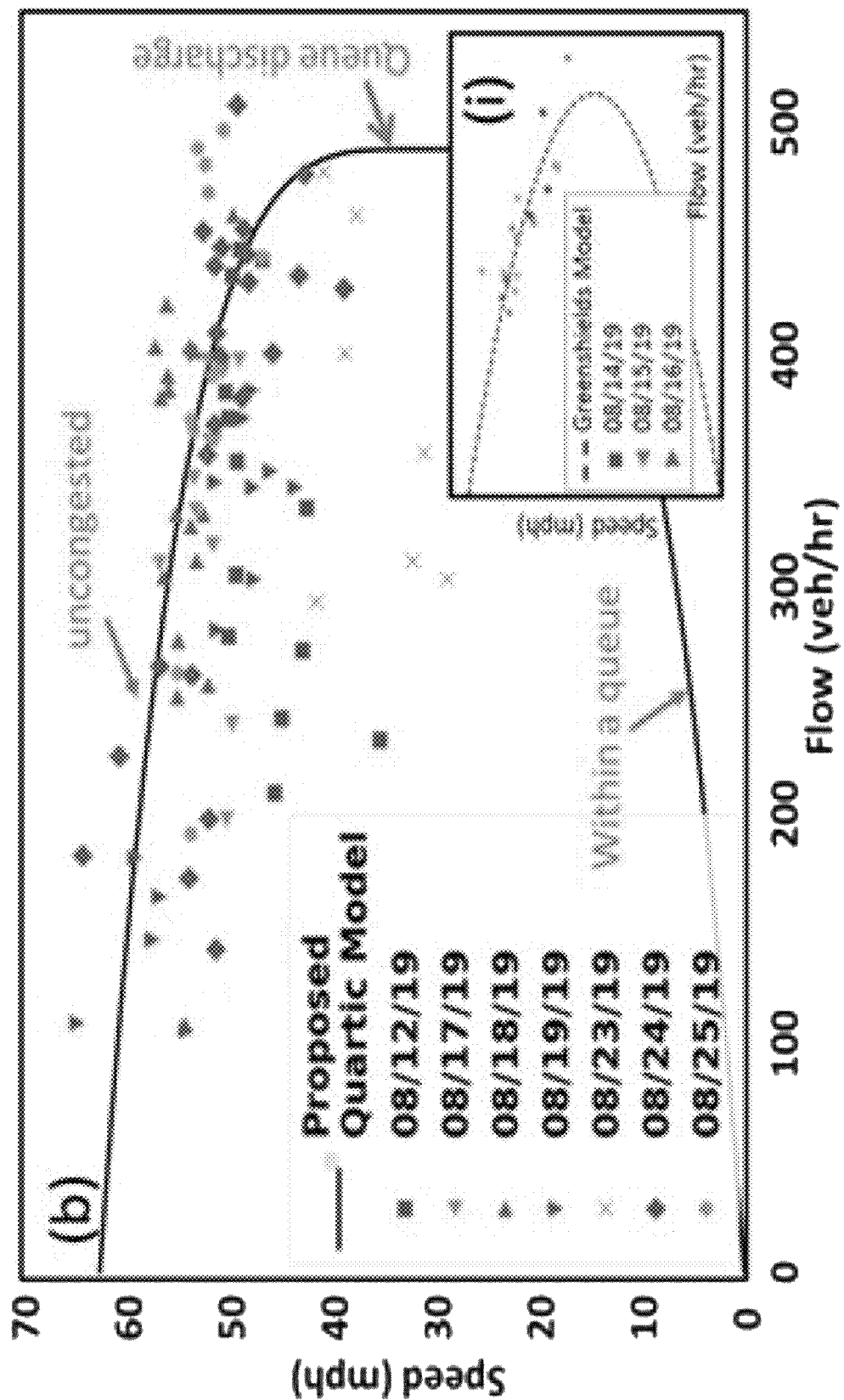

FIG. 5(A) and FIG. 5(B) are plots showing: FIG. 5(A), vehicle speed and flow for 2 section of a trial route; FIG. 5(B), the data (S2 on Route 5) fitted with proposed speed-flow formula and data (Route 2) fitted with Greenshields' model (i), according to aspects of the present disclosure.

Counting of vehicles and speed estimate(s) were achieved and shown in FIG. 5(A). We have measured vehicle speed and flow of the five selected routes with selected 1 to 5 sections for detailed study. For proof of concept, two sections in route 5 are discussed which represent expressway (S2) and local road (S1).

With reference to FIG. 5(A), there it shows a 6-day result. Much less flow on S1 over weekends and speeding during midnights for both sections was noticed. As will be readily appreciated by those skilled in the art, one benefit of optical fiber sensing system(s) is that a distributed measurement can cover a wide geographic area.

As will be further appreciated by those skilled in the art, it is important for operators of transportation system(s), especially highways, to have a complete understanding of traffic behavior—over a full range of operation—which is known as "road capacity". Measuring motor traffic flow is a precise way to understand the interaction between the vehicles and the infrastructure.

Applying a traffic flow model to the study introduces additional parameters of interest such as density, k, which is defined as numbers of vehicles in a measurement interval along the road (S' in FIG. 4(C)) and it is related to traffic flow, q, which is equal to ku, where:

$$k(x, t, S') = \frac{n}{\Delta x}$$

or

-continued $$k(x, t, S) = \frac{\sum_{i=1}^{n} \frac{1}{u_i}}{\Delta t}.$$

A Quartic function is employed to model flow-speed pattern(s) of traffic data collected during our trial, namely, $$q = k_j u_f - k_j u_f \left(\frac{1.7\, u}{u_f} - 1\right)^4$$

where u is the traffic speed, $k_j$ and $u_f$ are jam density and free flow speed, respectively.

Normalizing the flow to maximum flow capacity, $q_{max}$, yields:

$$q = q_{max}\left[1 - \left(\frac{1.7\, u}{u_f} - 1\right)^4\right].$$

By utilizing the model, a speed-flow curve is plotted as shown in FIG. 5(B).

With reference to that figure, it may be observed that there are three regions of the curve: 1) uncongested; 2) within a queue and 3) queue discharged. In the uncongested region, by specifying the curve for different speeds, two elements are assumed: a breakpoint at which speeds started to meet discharge area, and the speed at capacity. The vertical line for queue discharge flow is a result of traffic downstream from a queue.

We note that FIG. 5(B) shows the measured data of Section 2 on Route 5 fitted with speed-flow model. It can be seen that the most traffic stream is uncongested on this expressway, except 08/23/19 (Friday), which slightly meet in the discharge region.

FIG. 5(B) inset shows data of Route 2 fitted with Greenshields' model. It can be seen that the road capacity on the expressway of Route 2 was much less than the one of Route 5 which not even close to discharge point. In comparison to Greenshields' quadratic model which has a sharp pivot at the discharge point, the proposed model has flatter structure at flow capacity which better represents bottle-neck condition at maximum capacity. The data collection method used in this study alleviates earlier criticisms of Greenshields' model(s) regarding direct computation of density from speed-flow, stochastic nature of observations of data at the time, and finally exact matching of time-space measurements. Thus, our method and algorithm will help road operation and assist the decision making for future road designs.

At this point, while we have presented this disclosure using some specific examples, those skilled in the art will recognize that our teachings are not so limited. Accordingly, this disclosure should only be limited by the scope of the claims attached hereto.

The invention claimed is:

1. A distributed traffic informatics system comprising:
   a plurality of lengths of optical fiber, each individual length of said plurality of lengths of optical fibers respectively positioned alongside an individual roadway route of a plurality of roadway routes supporting vehicular traffic;
   an optical interrogator unit that generates optical pulses, introduces them into the optical fiber, and receives Rayleigh backscattered signals from the individual lengths of the plurality of lengths of optical fiber;
   an optical switch interposed between the interrogator and the individual lengths of the plurality of lengths of optical fiber providing selective optical communication between the interrogator and the individual lengths of optical fiber of the plurality of lengths of optical fiber, and
   a data processor unit that is configured to:
   determine from the backscattered signals, mechanical vibrations experienced by each of the individual lengths of optical fiber of the plurality of optical fibers resulting from a vehicle operating on the individual roadway routes alongside the individual lengths of optical fiber of the plurality of optical fibers; and
   determine characteristics of the vehicle that produced the determined mechanical vibrations and the individual roadway route on which the vehicle operated.

2. The system of claim 1 further comprising:
   a vehicle classifier and weight including a deep neural network for weight-in-motion (WIM) applications.

3. The system of claim 2 wherein the data processor is configured to generate from the backscattered signals time-distance (2-dimensional waterfall) graphs (images) representative of the vibrations experienced by the optical fiber along its length.

4. The system of claim 3 wherein the data processor is configured to normalize the time-distance graphs through the effect of a column normalization technique where each column of the time-distance graph represents vibration data collected at a particular location along the length of the optical fiber.

5. The system of claim 4 wherein the data processor is configured to perform the column normalization technique such that a sum of values in each column over each one minute duration is set to one.

6. The system of claim 5 wherein the data processor is configured to denoise the time-distance graphs.

7. The system of claim 3 wherein the classifier segments each pixel comprising the time-distance graphs into one of two classes selected from the group consisting of presence of a vehicle, and absence of a vehicle.

8. The system of claim 2 wherein the neural network is trained on synthetic, noisy, two dimensional time-distance data.

9. The system of claim 1 wherein the plurality of lengths of optical fiber carry telecommunications traffic.

* * * * *